(12) United States Patent  (10) Patent No.: US 8,997,128 B2
Kim et al.  (45) Date of Patent: Mar. 31, 2015

(54) OPTICAL DISC DRIVE HAVING A CABLE FOR CONNECTING ELECTRIC DEVICES

(71) Applicant: Toshiba Samsung Storage Technology Korea Corporation, Suwon-si (KR)

(72) Inventors: Jae-sung Kim, Yongin-si (KR); Hee-deuk Park, Seongnam-si (KR); Myung-do Oh, Suwon-si (KR)

(73) Assignee: Toshiba Samsung Storage Technology Korea Corporation, Suwon-si (KR)

( * ) Notice: Subject to any disclaimer, the term of this patent is extended or adjusted under 35 U.S.C. 154(b) by 0 days.

(21) Appl. No.: 13/887,513

(22) Filed: May 6, 2013

(65) Prior Publication Data

US 2013/0305267 A1  Nov. 14, 2013

(30) Foreign Application Priority Data

May 11, 2012 (KR) ........................ 10-2012-0050465

(51) Int. Cl.
 *G11B 17/04* (2006.01)
 *G11B 33/12* (2006.01)
 *G11B 17/056* (2006.01)

(52) U.S. Cl.
 CPC ............ *G11B 33/122* (2013.01); *G11B 17/056* (2013.01)
 USPC .......................................... 720/653; 720/610

(58) Field of Classification Search
 CPC ...... H01R 12/592; H01R 12/79; H01R 12/62; H01R 12/778; H01R 12/57; H01R 2107/00; G11B 17/056; G11B 33/122; G11B 33/12; G11B 17/051; G11B 33/02

USPC .................................. 720/652, 653, 601, 610
 See application file for complete search history.

(56) References Cited

U.S. PATENT DOCUMENTS

| | | | | |
|---|---|---|---|---|
| 4,722,692 A | * | 2/1988 | Tengler et al. | 439/92 |
| 6,020,559 A | * | 2/2000 | Maeda | 174/117 F |
| 6,151,284 A | * | 11/2000 | Watanabe et al. | 720/601 |
| 6,351,351 B1 | * | 2/2002 | Takasugi | 360/245.9 |
| 6,360,427 B1 | * | 3/2002 | Takasugi | 29/603.06 |
| 6,826,764 B2 | * | 11/2004 | Fujisawa | 720/610 |

(Continued)

FOREIGN PATENT DOCUMENTS

JP  05-67997  9/1993
JP  10-64652  3/1998

(Continued)

OTHER PUBLICATIONS

Korean Office Action issued on Feb. 5, 2013 in counterpart Korean Patent Application No. 10-2012-0050465. (4 pages in Korean).

*Primary Examiner* — Brian Miller
(74) *Attorney, Agent, or Firm* — NSIP Law

(57) ABSTRACT

An optical disc drive (ODD) including a tray having a spindle motor, an optical pickup unit, and a transfer motor, may have first and second flat cables. The first flat cable may be connected to the transfer motor, and the second flat cable may have a first terminal part connected to the first flat cable and a second terminal part connected to a circuit board. The circuit board may be arranged at the front of the tray. The second flat cable may include a plurality of signal lines covered by an insulator. One or more exposure parts may be formed in the second flat cable to expose at least one of the plurality of signal lines. An electric actuator of a locking unit may be connected to the one or more of the plurality of signal lines through the one or more exposure parts.

23 Claims, 9 Drawing Sheets

(56) References Cited

U.S. PATENT DOCUMENTS

| | | | |
|---|---|---|---|
| 6,981,271 B2* | 12/2005 | Minase et al. | 720/652 |
| 7,137,131 B2* | 11/2006 | Park et al. | 720/650 |
| 7,234,149 B2* | 6/2007 | Takahashi et al. | 720/601 |
| 7,411,874 B2* | 8/2008 | Omori et al. | 369/44.14 |
| 7,716,694 B2* | 5/2010 | Huang et al. | 720/653 |
| 2003/0117929 A1* | 6/2003 | Bae et al. | 369/75.2 |
| 2004/0117807 A1* | 6/2004 | Takahashi et al. | 720/610 |
| 2004/0205785 A1* | 10/2004 | Takahashi et al. | 720/601 |
| 2005/0097583 A1* | 5/2005 | Okumura | 720/652 |
| 2006/0041897 A1* | 2/2006 | Takahashi et al. | 720/652 |
| 2007/0162916 A1* | 7/2007 | Omori | 720/601 |
| 2011/0191793 A1* | 8/2011 | Ishizuka et al. | 720/652 |
| 2012/0181075 A1* | 7/2012 | Su et al. | 174/261 |

FOREIGN PATENT DOCUMENTS

| | | |
|---|---|---|
| JP | 2001-344863 | 12/2001 |
| JP | 2006-338761 | 12/2006 |
| JP | 2007-207300 | 8/2007 |
| KR | 10-0855342 | 9/2008 |
| KR | 10-2010-0070065 | 6/2010 |

* cited by examiner

OPTICAL DISC DRIVE HAVING A CABLE FOR CONNECTING ELECTRIC DEVICES

CROSS-REFERENCE TO RELATED PATENT APPLICATION

This application claims the benefit under 35 U.S.C. §119 (a) of Korean Patent Application No. 10-2012-0050465, filed on May 11, 2012, in the Korean Intellectual Property Office, the entire disclosure of which is incorporated herein by reference for all purposes.

BACKGROUND

1. Field

The following description relates to an optical disc drive (ODD), and more particularly, to an ODD having a cable for connecting electric devices to each other.

2. Description of Related Art

An ODD is a device for recording and/or reading information on and/or from a rotating optical disc. The ODD typically includes a spindle motor for rotating the optical disc and an optical pickup for recording and/or reading information on or from the disc. The ODD may also include a transfer motor for moving the optical pickup in a radial direction of the disc. In addition, the ODD may include a solenoid for locking and unlocking a tray on which the disc is loaded.

The ODD includes a plurality of electric devices. The electric devices are typically connected to a main control board via one or more cables. However, these cables can require significant parts and labor which can increase the cost of production of an optical disc drive.

SUMMARY

In an aspect, there is provided an optical disc drive (ODD) comprising a tray comprising a spindle motor configured to rotate a disc, an optical pickup unit, and a transfer motor configured to slide the optical pickup unit in a radial direction of the disc; a first flat cable connected to the transfer motor; a circuit board arranged at the front of the tray; and a second flat cable, comprising a plurality of signal lines covered by an insulator, a first terminal part connected to the first flat cable, and a second terminal part connected to the circuit board.

The second flat cable may include one or more exposure parts formed by removing a portion of the insulator between the first and second terminal parts to expose at least one of the plurality of signal lines therethrough.

The first flat cable may be a flexible printed circuit (FPC), and the second flat cable may be a flexible flat cable (FFC).

The circuit board may be arranged at the front of the tray, and at least one blinker may be mounted on the circuit board.

The ODD may further comprise a main frame in which the tray is slidably installed; and a locking unit, configured to selectively lock the tray to the main frame, and comprising an electrical actuator, wherein a terminal part of the electrical actuator is connected, through the one or more exposure parts, to one or more actuator signal lines among the plurality of signal lines.

The one or more actuator signal lines may include first and second actuator signal lines, and the first and second actuator signal lines may be arranged at both sides of the second flat cable in a width direction of the second flat cable.

The one or more actuator signal lines may include first and second actuator signal lines, the one or more exposure parts may include first and second exposure parts for exposing the first and second actuator signal lines, respectively, and the first and second exposure parts may be misaligned with each other in a length direction of the second flat cable.

The circuit board may further comprise a switch to activate the actuator.

In an aspect, there is provided an ODD comprising a tray comprising a spindle motor configured to rotate a disc, an optical pickup, and a transfer motor configured to slide the optical pickup in a radial direction of the disc; a main frame in which the tray is slidably installed; a flexible printed circuit (FPC) connected to at least one of the spindle motor and the transfer motor; and a flexible flat cable (FFC), comprising a plurality of signal lines covered by an insulator, a first terminal part connected to the FPC, a second terminal part located on the opposite side of the first terminal part, and one or more exposure parts formed by removing a portion of the insulator between the first and second terminal parts to expose at least one of the plurality of signal lines therethrough.

The one or more exposure parts may comprise a plurality of exposure parts arranged separately in a width direction of the FFC.

The one or more exposure parts may comprise a plurality of exposure parts, and at least one of the plurality of exposure parts may be arranged to be misaligned with the other exposure parts in a length direction of the FFC. The ODD may further include a locking unit, which may be configured to selectively lock the tray to the main frame and may include a solenoid, wherein a terminal part of the solenoid may be connected to the exposed signal line through the one or more exposure part.

The ODD may further include a circuit board on which a switch to activate the solenoid may be provided, wherein the second terminal part may be connected to the circuit board.

In an aspect, there is provided an ODD comprising a spindle motor configured to rotate a disc; an optical pickup; a transfer motor configured to slide the optical pickup in a radial direction of the disc; a first cable connected to at least one of the spindle motor and the transfer motor; a second cable, comprising a plurality of signal lines covered by an insulator, a first terminal part, a second terminal part located on the opposite side of the first terminal part, and one or more exposure parts formed by removing a portion of the insulator between the first and second terminal parts to expose at least one of the plurality of signal lines therethrough; and at least one electric device connected to the exposed signal line through the one or more exposure part.

The one or more exposure parts may comprise a plurality of exposure parts, and the plurality of exposure parts may be arranged separately in a width direction of the second cable.

The one or more exposure parts may comprise a plurality of exposure parts, and at least one of the plurality of exposure parts may be arranged to be misaligned with the other exposure parts in a length direction of the second cable. The ODD may further comprise a tray on which the spindle motor, the optical pickup, and the transfer motor may be mounted; a main frame in which the tray may be slidably installed; and a locking unit, which may be configured to selectively lock the tray to the main frame and may comprise a solenoid, wherein the at least one electric device may be the solenoid.

The first terminal part may be connected to the first cable.

The second terminal part may be connected to a circuit board, which may be mounted at the front of the tray and on which a switch for activating the solenoid may be mounted.

The first cable may be a flexible printed circuit (FPC), and the second cable may be a flexible flat cable (FFC).

Figure 1:
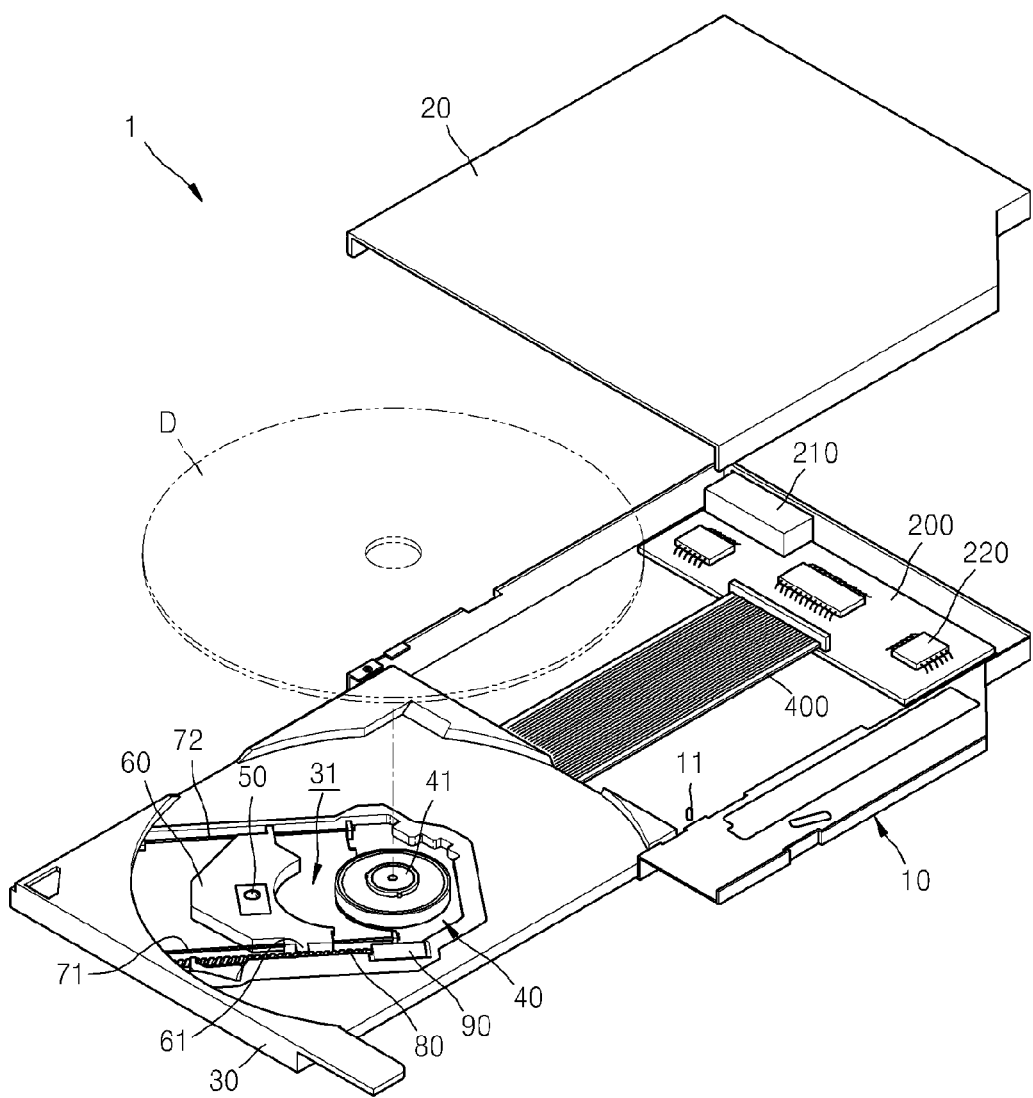
FIG. 1 is a diagram illustrating an example of an exploded perspective view of an optical disc drive (ODD)

Throughout the drawings and the detailed description, unless otherwise described, the same drawing reference numerals will be understood to refer to the same elements, features, and structures. The relative size and depiction of these elements may be exaggerated for clarity, illustration, and convenience.

DETAILED DESCRIPTION OF THE INVENTION

The following detailed description is provided to assist the reader in gaining a comprehensive understanding of the methods, apparatuses, and/or systems described herein. Accordingly, various changes, modifications, and equivalents of the methods, apparatuses, and/or systems described herein will be suggested to those of ordinary skill in the art. Also, descriptions of well-known functions and constructions may be omitted for increased clarity and conciseness.

Figure 2:
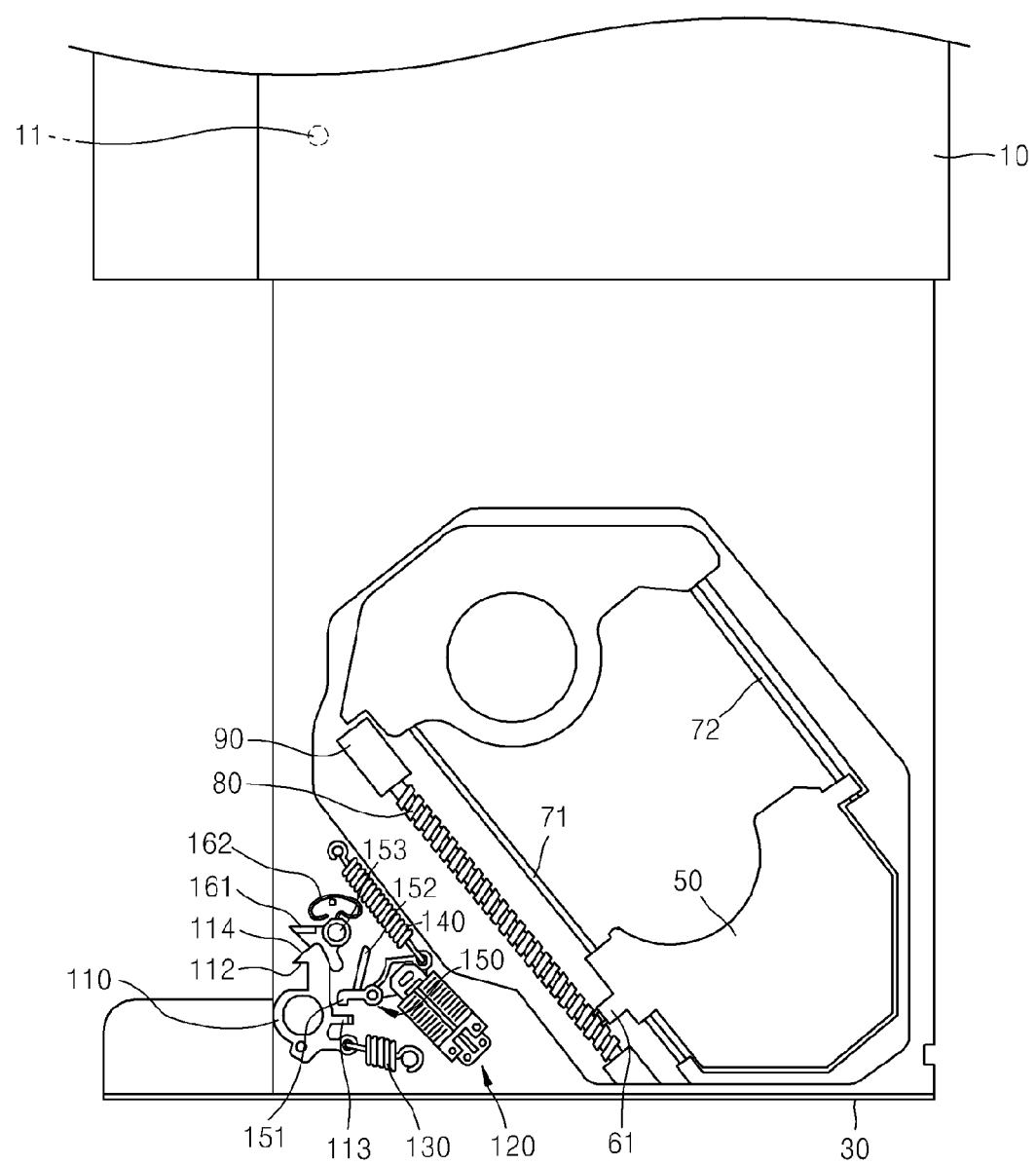
FIG. 2 is a diagram illustrating an example of a rear view of the ODD of FIG. 1.

FIG. 1 illustrates an example of an exploded perspective view of an optical disc drive (ODD) 1. FIG. 2 illustrates an example of a rear view of the ODD 1 of FIG. 1. Referring to FIGS. 1 and 2, the ODD 1 includes a spindle motor 40 that may rotate a disc D and an optical pickup unit 50 that may read and record information to and from the disc D by radiating light towards the disc D. For example, the optical pickup unit 50 may be mounted on a pickup base 60 moving in a radial direction of the disc D.

In this example, a main frame 10 may act as a main chassis. A tray 30 on which the disc D is loaded may be slidably assembled with the main frame 10. A cover 20 covers the upper part of the main frame 10, and a space is formed between the cover 20 and the main frame 10. The tray 30 may be inserted into or withdrawn from the space formed between the cover 20 and the main frame 10.

For example, the tray 30 may act as a frame on which a plurality of parts, such as the spindle motor 40, the pickup base 60, and so forth, may be mounted. That is, the spindle motor 40, with a turntable 41 on which the disc D is loaded, and the pickup base 60, on which the optical pickup unit 50 is mounted, may be installed in the tray 30. The turntable 41 may be provided on a rotation axis of the spindle motor 40. The tray 30 may include an opening 31, which is sunken or which penetrates in a vertical direction. The pickup base 60 may slide through the opening 31. Guide shafts 71 and 72, for guiding the sliding of the pickup base 60, may be mounted at both sides of the opening 31. The pickup base 60 may be supported by the guide shafts 71 and 72. A lead screw 80, which extends in a transfer direction of the pickup base 60, may be arranged at one side of the opening 31. A lead guide 61, which is engaged with a spiral grove of the lead screw 80, may be provided at one side of the pickup base 60. A transfer motor 90 may rotate the lead screw 80. For example, the transfer motor 90 may be a stepping motor having a rotation axis that is connected to or formed integrally with the lead screw 80.

In this example, a locking unit may be provided for selectively locking or unlocking the tray 30 to or from the main frame 10. The locking unit may include a locking lever 110 and an actuator for activating the locking lever 110. For example, the actuator that is provided may be a solenoid 120. When the tray 30 is inserted into the main frame 10, the locking lever 110 may be locked to a locking protrusion 11 provided in the main frame 10. The locking lever 110 and locking protrusion 11 may thereby lock the tray 30 to the main frame 10. As an example, the locking protrusion 11 may be a post protruding towards the inside of the main frame 10. Also, to withdraw the tray 30, in this example, the solenoid 120 may be activated to unlock the locking lever 110 from the locking protrusion 11. Various examples may be adopted for a structure of the solenoid 120 and a mechanical structure for operating the locking lever 110 using the solenoid 120.

Referring to FIG. 2, the locking lever 110 is rotatably installed in the tray 30 and includes a hook 112 that is hooked to the locking protrusion 11 of the main frame 10. The locking lever 110 may rotate to a locking position (refer to FIG. 4) at which the hook 112 is hooked to the locking protrusion 11. The locking lever may also rotate to an unlocking position (refer to FIG. 5) at which the hook 112 is unhooked from the locking protrusion 11. In this example, a first elastic member 130 may apply an elastic force to the locking lever 110 to rotate the locking lever 110 to the locking position. The first elastic member 130 may be, for example, a tensile coil spring having one end which is connected to the locking lever 110 and another end which is connected to the tray 30.

Figure 3:
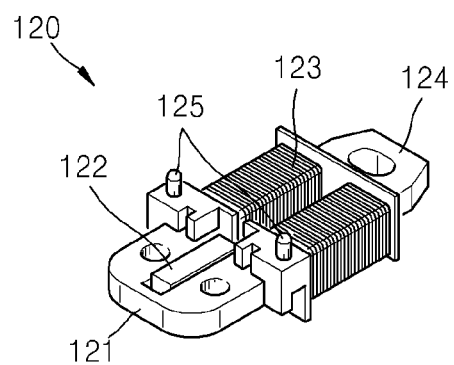
FIG. 3 is a diagram illustrating an example of a perspective view of a solenoid.

FIG. 3 illustrates an example of a perspective view of the solenoid 120. Referring to FIG. 3, the solenoid 120 includes a fixing part 121, a permanent magnet 122, a coil part 123, and a movable part 124. A current may be applied to the coil part 123 through a pair of terminal parts 125. The fixing part 121 may be fixed to the tray 30 by a screw or an alternative fixing structure. The permanent magnet 122 may be provided in the fixing part 121. In this example, the fixing part 121 may be formed of a magnetic material such as iron. The coil part 123 may have a shape extending from the fixing part 121. The movable part 124 may extend inside the coil part 123 and may be movable back and forth in a magnetic force direction. That is, the movable part 124 may be movable towards the permanent magnet 122 by a magnetic force. In addition, when electricity is supplied to the coil part 123, the coil part 123 may generate an electromagnetic force for offsetting the magnetic force of the permanent magnet 122. Further, the movable part 124 may move in a direction apart from the permanent magnet 122 by, for example, an elastic force of a second elastic member 140.

In this example, an unlocking lever 150 may be rotatably installed in the tray 30. The unlocking lever 150 may include an unlocking part 151. The unlocking part 151 may be provided to rotatably move the locking lever 110 to the unlocking position according to interference between the unlocking part 151 and a protruded part 113 of the locking lever 110. The second elastic member 140 may provide an elastic force to the unlocking lever 150 so that the unlocking lever 150 rotatably moves in a direction that moves the locking lever 110 to an unlocking position. For example, the second elastic member 140 may be a tensile coil spring having one end connected to the tray and another end connected to the unlocking lever. In this example, the unlocking lever 150 may be connected to the movable part 124. The second elastic member 140 may provide an elastic force to the movable part 124, such that the movable part 124 moves in a direction apart from the permanent magnet 122.

Figure 5:
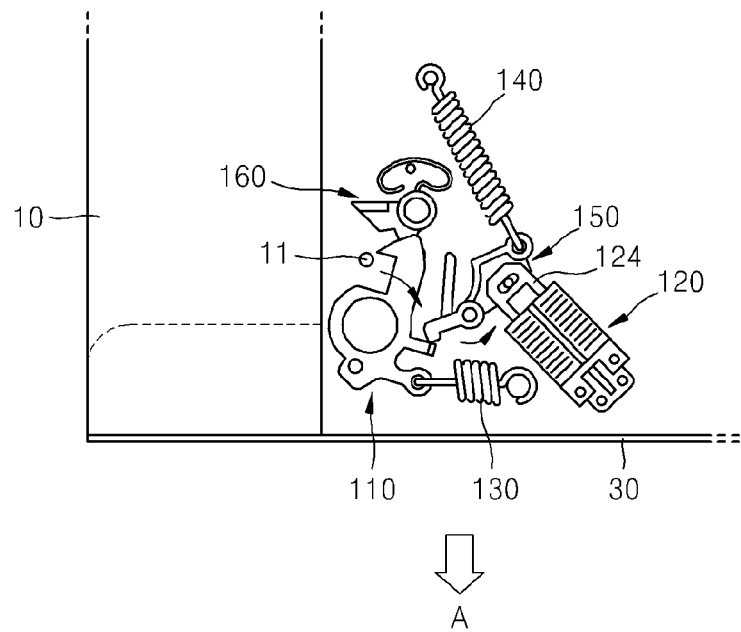
FIG. 5 is a diagram illustrating an example of a partial rear view of the ODD of FIG. 1 in which a locking lever is located at a release position for the tray to be withdrawn from the main frame.
Figure 6:
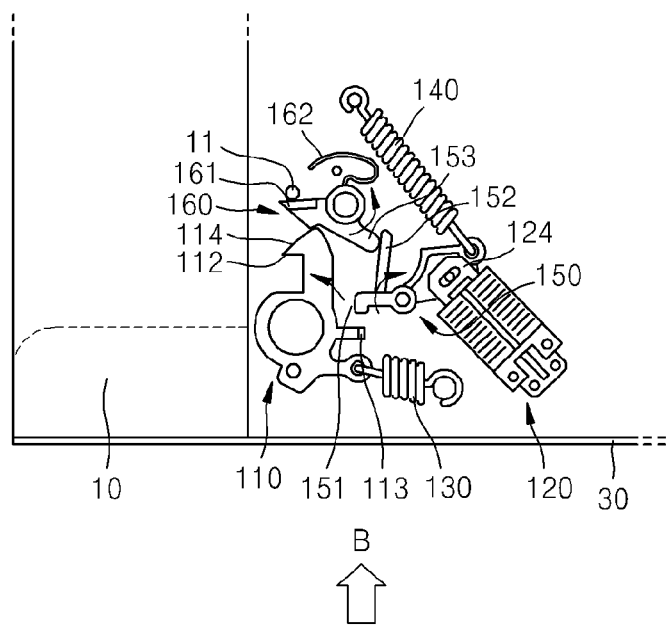
FIG. 6 is a diagram illustrating an example of a partial rear view of the ODD of FIG. 1 in which the tray is being inserted into the main frame.

Referring to FIGS. 5 and 6, when the tray is loaded, a return lever 160 may push the movable part 124 to attach the movable part 124 to the permanent magnet 122. The pushing movement of the return lever 160 may be caused by interference between the return lever 160 and the locking protrusion 11. As a result, the locking lever 110 may return to the locking position, and the unlocking lever 150 and movable part 124 may return to their original positions. The return lever 160 may be rotatably installed in the tray 30. Also, the return lever may include an interference part 161, an elastic arm 162, and a return arm 153. The interference part 161 may be for interfering with the locking protrusion 11. The return arm 153 may be for pushing a return part 152 of the unlocking lever 150. The elastic arm 162 may be for returning the return lever 160, which was rotatably moved when the tray 30 was loaded, to its original position by an elastic force. Also, in this example, a limit protrusion 170 may cause transformation of the elastic arm 162 by interference between the limit protrusion 170 and the elastic arm 162. This may generate an elastic force for returning the return lever 160 to its original position.

An example of a locking/unlocking operation of the described example of a locking unit will now be described.

Figure 4:
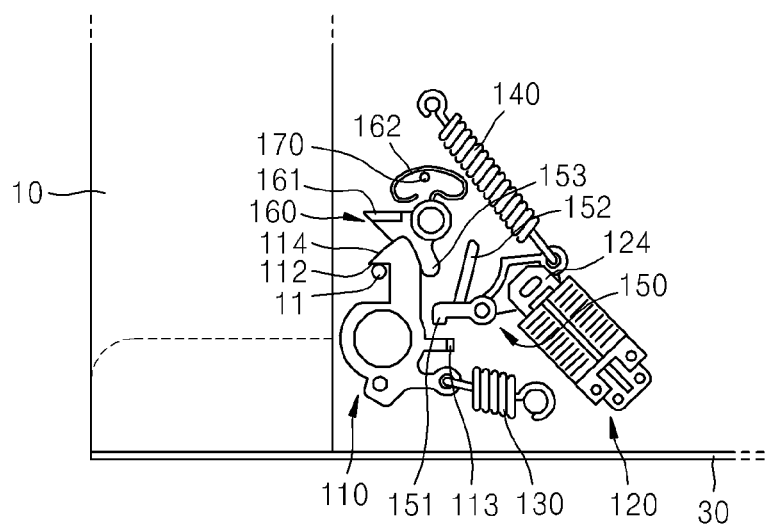
FIG. 4 is a diagram illustrating an example of a partial rear view of the ODD of FIG. 1 in which a tray is inserted and locked into a main frame.

First, an example of a process for withdrawing the tray 30 from the main frame 10 is described. FIG. 4 illustrates an example of a partial rear view of the ODD 1 of FIG. 1 in which the tray 30 is inserted and locked into the main frame 10. In this example, the locking lever 110 may be located at the locking position, and the hook 112 may be hooked to the locking protrusion 11, thereby causing the tray 30 not to be withdrawn from the main frame 10. The movable part 124 may be attached to the permanent magnet 122, and a current applied to the coil part 123 may be cut off.

In this state, if a current is applied to the coil part 123 through the pair of terminal parts 125, the coil part 123 may generate an electromagnetic force for offsetting the magnetic force of the permanent magnet 122. This allows the movable part 124 to move away from the permanent magnet 122 and the fixing part 121. The elastic force of the second elastic member 140 also allows the part 124 to move away from the magnet 122 and fixing part 121. As shown in FIG. 5, the movement of the movable part 124 may cause the unlocking part 151 to push the protruded part 113 of the locking lever 110. This may result in rotatably moving the locking lever 110 in a clockwise direction. Also, the hook 112 may move apart from the locking protrusion 11, thereby unlocking the tray 30 from the main frame 10.

The current applied to the coil part 123 may be cut off as soon as the movable part 124 is apart from the permanent magnet 122 and fixing part 121. In this state, the tray 30 may be withdrawn from the main frame 10 by sliding the tray 30 in a direction A of FIG. 5. When the tray 30 is withdrawn, the return lever 160 may rotate clockwise by interfering with the locking protrusion 11. The return lever 160 may then return to its original position, as shown in FIG. 4, by the elastic force of the elastic arm 162.

Next, an example of a process of inserting the tray 30 into the main frame 10 is described. Referring to FIG. 6, the disc D may be loaded on the tray 30, and the tray 30 may be inserted into the main frame 10 by pushing the tray 30 in a direction B. When the tray 30 is inserted, the locking protrusion 11 may interfere with the interference part 161 of the return lever 160, thereby rotatably moving the return lever 160 counterclockwise. The rotation of the return lever 160, including the return arm 153, may push the return part 152 of the unlocking lever 150. This may cause the unlocking lever 150 to rotate clockwise. Accordingly, the movable part 124 may move towards the permanent magnet 122 to be attached to the permanent magnet 122 and the fixing part 121. This attachment is maintained as a result of the magnetic force of the permanent magnet 122. Finally, in this example, the locking lever 110 rotatably moves counterclockwise by the elastic force of the first elastic member 130 and returns to the locking position. When the interference between the locking protrusion 11 and the interference part 161 ends, the return lever 160 may return to its original position by the elastic force of the elastic arm 162.

Still referring to FIG. 6, if the tray 30 is further pushed in the direction B, the locking protrusion 11 interferes with a slope part 114 of the locking lever 110. As a result, the locking lever 110 temporarily rotates clockwise, returning to the locking position when the interference between the locking protrusion 11 and the slope part 114 ends. Accordingly, referring to FIG. 4, the tray returns to the locked position, where the locking protrusion 11 is hooked to the hook 112 and the tray 30 is locked to the main frame 10.

Figure 7:
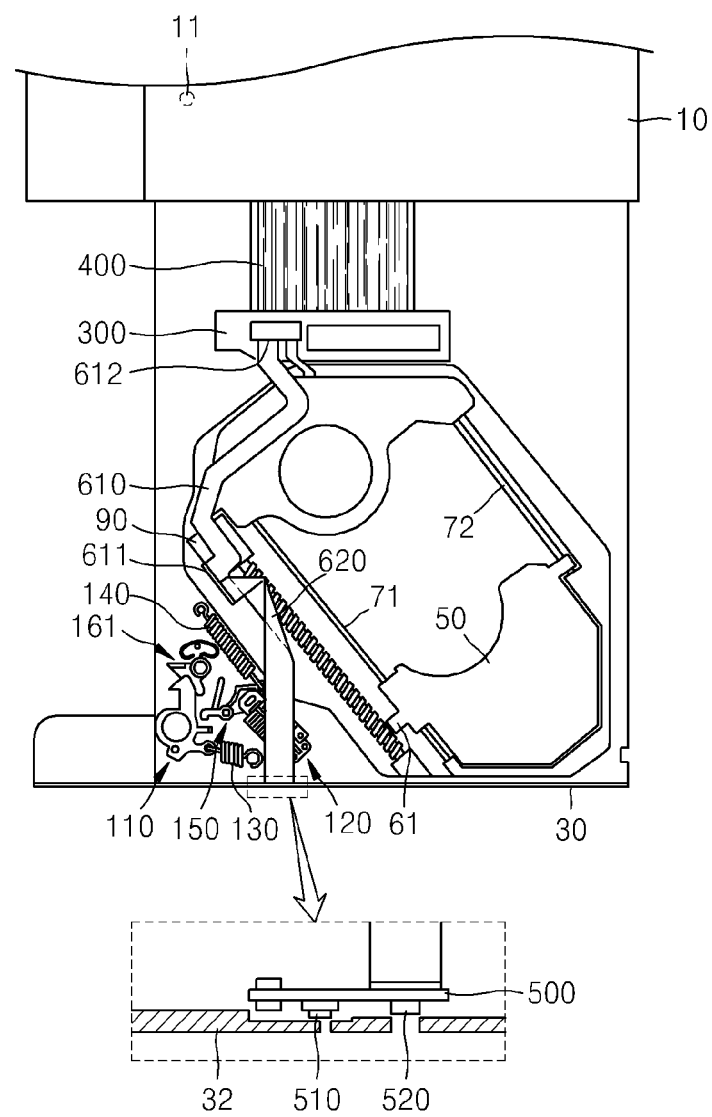
FIG. 7 is a diagram illustrating an example of a rear view of the ODD of FIG. 1 in which electric devices are connected using first and second flat cables.

Referring to FIG. 7, a circuit board 500 may be provided at the front of the tray 30. In this example, the circuit board 500 may include a switch 510. The switch 510 may be a switch for activating the solenoid 120 to withdraw the tray 30 from the main frame 10. The switch 510 may be, for example, a tact switch that may operate by pushing a push arm 32 provided at the front surface of the tray 30. In addition, the circuit board 500 may include a blinker 520 for displaying an operational state of the ODD 1. In this example, the blinker 520 may be a light-emitting diode (LED).

Referring to FIGS. 1 and 7, an example of a connection structure between the electric devices of the ODD 1 and a main control board 200 is illustrated. The electric device of the ODD1 may include the spindle motor 40, the optical pickup unit 50, the transfer motor 90, the solenoid 120, and the circuit board 500. The main control board 200 may be mounted on the main frame 10. The main control board 200 may include a main connector 210 and a driving circuit unit 220. The main connector may connect the ODD 1 to an external power supply or host device, such as a personal computer (PC). The driving circuit unit 220 may be provided for driving the ODD 1.

The electric devices may be directly connected to the main control board 200. However, in this example, the electric devices are connected to the main control board 200 through an auxiliary circuit board 300 and a main connection cable 400. The auxiliary circuit board 300 may be, for example, provided in the tray 30. The main connection cable 400 may be, for example, a flat cable.

Figure 8:
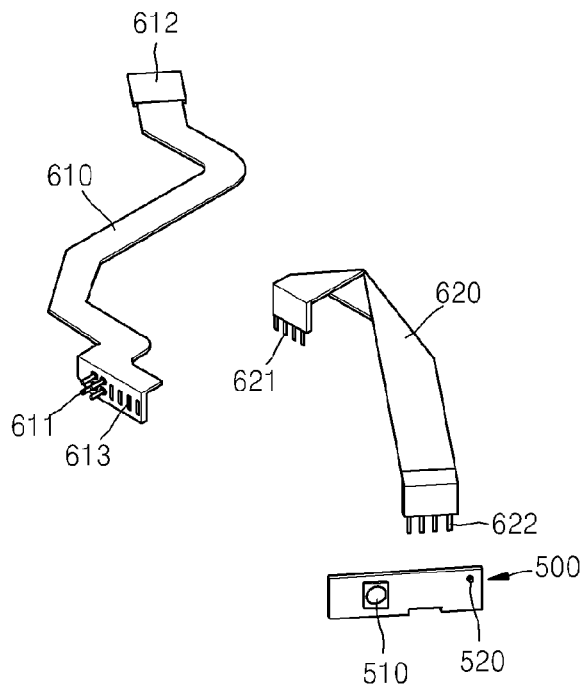
FIG. 8 is a diagram illustrating an example of an exploded perspective view of the first flat cable and a circuit board that are connected using the second flat cable.

Referring to FIGS. 7 and 8, a first cable 610 and a second cable 620 may be provided. The first and second cables 610 and 620 may be flat cables. Hereinafter, the first and second cables 610 and 620 are referred to as the first and second flat cables 610 and 620.

For example, the first flat cable may be used for connecting the transfer motor 90 to the auxiliary circuit board. For example, the first flat cable 610 may include a first contact part 611, connected to the transfer motor 90, and a terminal part 612, connected to the auxiliary circuit board 300. The second flat cable 620 may be used for connecting the circuit board 500 to the first flat cable 610. For example, the second flat cable 620 may include a first terminal part 621, connected to the first flat cable 610, and a second terminal part 622, connected to the circuit board 500. In addition, the first flat cable 610 may further include a connector 613 to which the first terminal part 621 of the second flat cable 620 is electrically connected. For example, the first terminal part 621 may be soldered to the connector 613, and the second terminal part 622 may be soldered to the circuit board 500.

When electric devices are arranged in a direct line, one flat cable may be sufficient to connect all the electric devices to the main control board 200 directly or via the auxiliary circuit board 300. In this case, by employing a flat cable, the electric devices may be connected to the main control board 200 in a very cost effective and simple structure. However, it may be difficult to design a layout of the ODD 1 so that the electric devices are arranged in a direct line. This is due to the fact that the optical pickup unit 50 is arranged to move along a path inclined at a predetermined angle against a withdrawal direction of the tray 30 for miniaturization of the ODD 1.

In this example, the flat cable may be a flexible printed circuit (FPC) or a flexible flat cable (FFC). A FPC may be obtained by forming a printed circuit pattern between flexible insulation substrates. Because circuit patterns are formed by a print method, a gap between the circuit patterns may be very narrow, and the circuit patterns may be formed in various forms. However, it is noted that FPCs are expensive. The flat cable may also be an FFC. A FFC is a flat cable taking the form of a conductor delivering an electrical signal that is surrounded by an insulator. A FFC is usually manufactured only in a linear shape. However, the FFC is cheaper than the FPC.

In this example, the ODD 1 employs at least one FFC. Referring to FIGS. 7 and 8, the first flat cable 610 may have a complex signal pattern, and a shape that is not a direct line form. Thus, a FPC may be employed for the first flat cable 610. The second flat cable 620 may have a small number of signal lines and a simple direct line form. Thus, a FFC may be employed for the second flat cable 620.

If the first and second flat cables 610 and 620 are formed by a FPC, the cost of manufacture may be more expensive. Because a FPC is manufactured using a raw plate of a predetermined standard, the more FPCs manufactured from a single raw plate, the cheaper the cost of manufacture. A FPC raw plate may have an insulation film form coated by a conductor, and the FPC may be manufactured by etching the conductor to form a plurality of desired circuit patterns and cutting the circuit patterns. Thus, if the shape of the circuit patterns is severely irregular and complex, a loss that is discarded from the raw plate increases, thereby increasing the price of a unit FPC. Accordingly, the cost of manufacture of a FPC is more effective if its shape is relatively simple and its size is relatively small.

For the ODD 1 of this example, a FPC may be used for the first flat cable 610 and a FFC may be used for the second flat cable 620. The first flat cable 610 is typically difficult to manufacture in a direct line form and the second cable 620 typically has a simple shape. Accordingly, compared with the case where both the first and second flat cables 610 and 620 are formed by a FPC, in this example, the cost of parts may be reduced.

Figure 9:
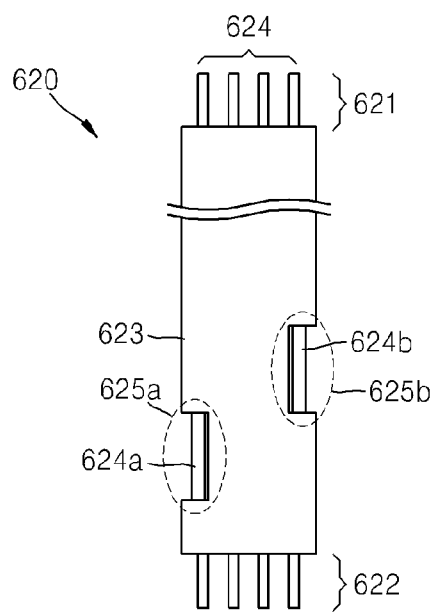
FIG. 9 is a diagram illustrating an example of a top view of the second flat cable having an exposure part.

If a separate flat cable is employed to electrically connect the actuator, e.g., the solenoid 120, of the locking unit to the main control circuit 200, the cost of parts may increase. To reduce the cost of parts, the solenoid 120 may be electrically connected to the main control circuit 200 by using the second flat cable 620. For example, as shown in FIGS. 9 and 10, the second flat cable 620 may include a plurality of signal lines 624 covered by an insulator 623, and the plurality of signal lines 624 may include first and second solenoid signal lines 624a and 624b for connecting the solenoid 120 thereto.

Referring to FIGS. 7 and 8, it is difficult to connect the second terminal part 622 to the solenoid 120 since the solenoid 120 is apart from the circuit board 500. Referring to FIG. 9, by removing a portion of the insulator 623 between the first and second terminal parts 621 and 622 of the second flat cable 620, first and second exposure parts 625a and 625b may be exposed. Portions of the first and second solenoid signal lines (first and second actuator signal lines) 624a and 624b are exposed through the exposure parts 625a and 625b. In addition, referring to FIG. 10, the pair of terminal parts 125 of the solenoid 120 may be connected to the first and second solenoid signal lines 624a and 624b through the first and second exposure parts 625a and 625b. The pair of terminal parts 125 may be connected to the first and second solenoid signal lines 624a and 624b by, for example, soldering.

Figure 10:
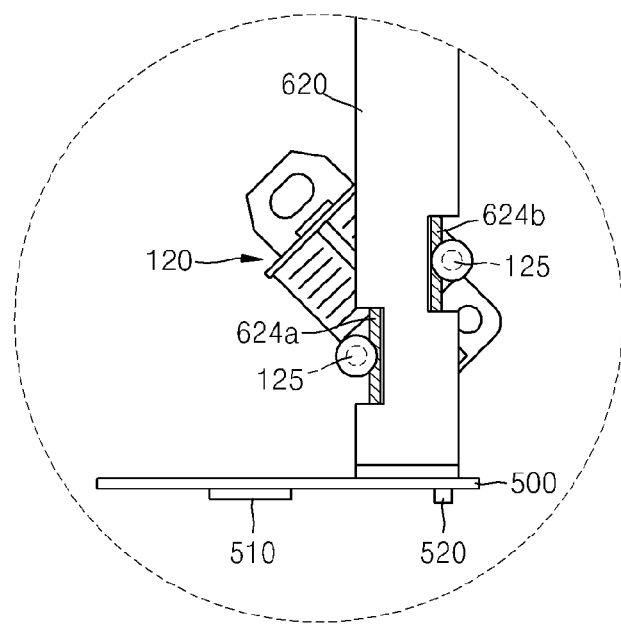
FIG. 10 is a diagram illustrating an example of a top view in which a solenoid is connected to signal lines through the exposure part of the second flat cable.

Still referring to FIG. 10, the first and second solenoid signal lines 624a and 624b may be arranged at opposite sides of the second flat cable 620 in a width direction of the second flat cable 620. In this example, the first and second solenoid signal lines 624a and 624b may be as far from each other as possible, thereby reducing a risk of an electrical short. In addition, the first and second exposure parts 625a and 625b may be arranged to be misaligned with each other in a length direction of the second flat cable 620. Accordingly, the risk of an electrical short may be further reduced.

As a result of the examples described, a cable for connecting the solenoid 120 to the main control board 200 may be avoided, thereby reducing the cost of parts.

Figure 11:
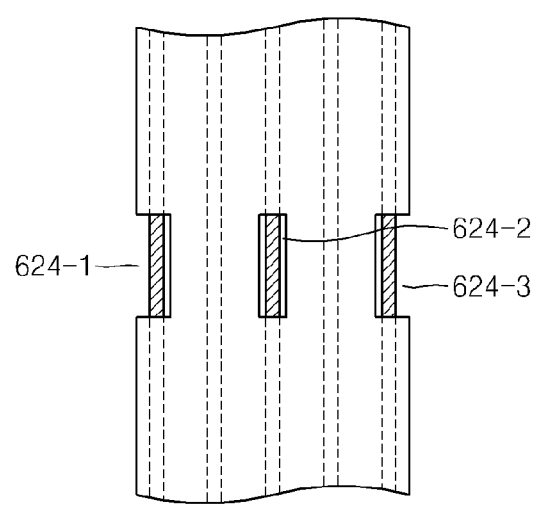
FIG. 11 is a diagram illustrating an example of a top view in which a plurality of exposure parts are arranged not too close to each other.
Figure 12:
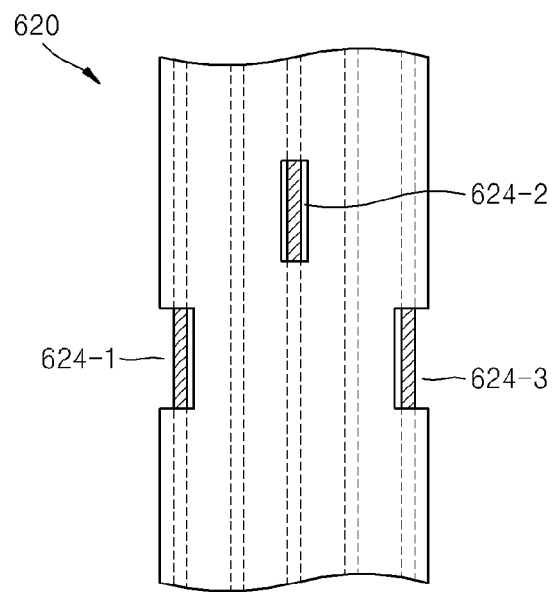
FIG. 12 is a diagram illustrating an example of a top view in which at least one of the plurality of exposure parts are arranged to be misaligned with others in a length direction.
Figure 13:
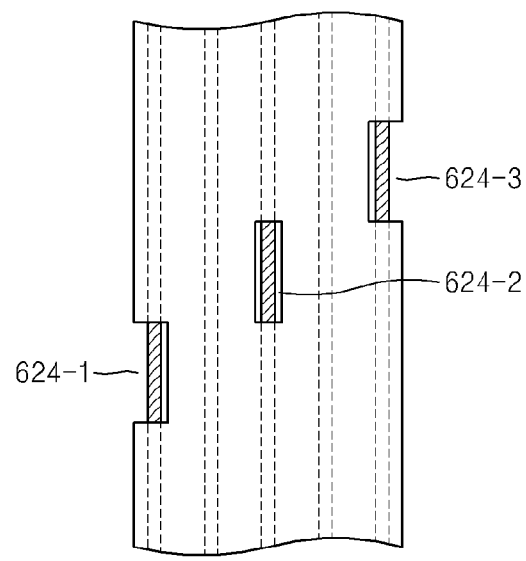
FIG. 13 is a diagram illustrating an example of a top view in which at least one of the plurality of exposure parts are arranged to be misaligned with others in the length direction.

Although the above example describes two exposure parts, any number of exposure parts may be used. For example, referring to FIG. 11, three exposure parts 624-1, 624-2, and 624-3 may be provided. The exposure parts 624-1, 624-2, and 624-3 may be arranged to be separated in a width direction so as to be as far apart from each other as possible. In addition, referring to FIG. 12, at least one of the three exposure parts 624-1, 624-2, and 624-3, e.g., the exposure part 624-2, may be arranged to be misaligned with the other exposure parts 624-1 and 624-3 in a length direction. In addition, referring to FIG. 13, other arrangements may be possible. That is, at least one of a plurality of exposure parts may be arranged to be misaligned with the other exposure parts in the length direction, thereby securing a space for a soldering work to reduce a risk of an electrical short.

Figure 14:
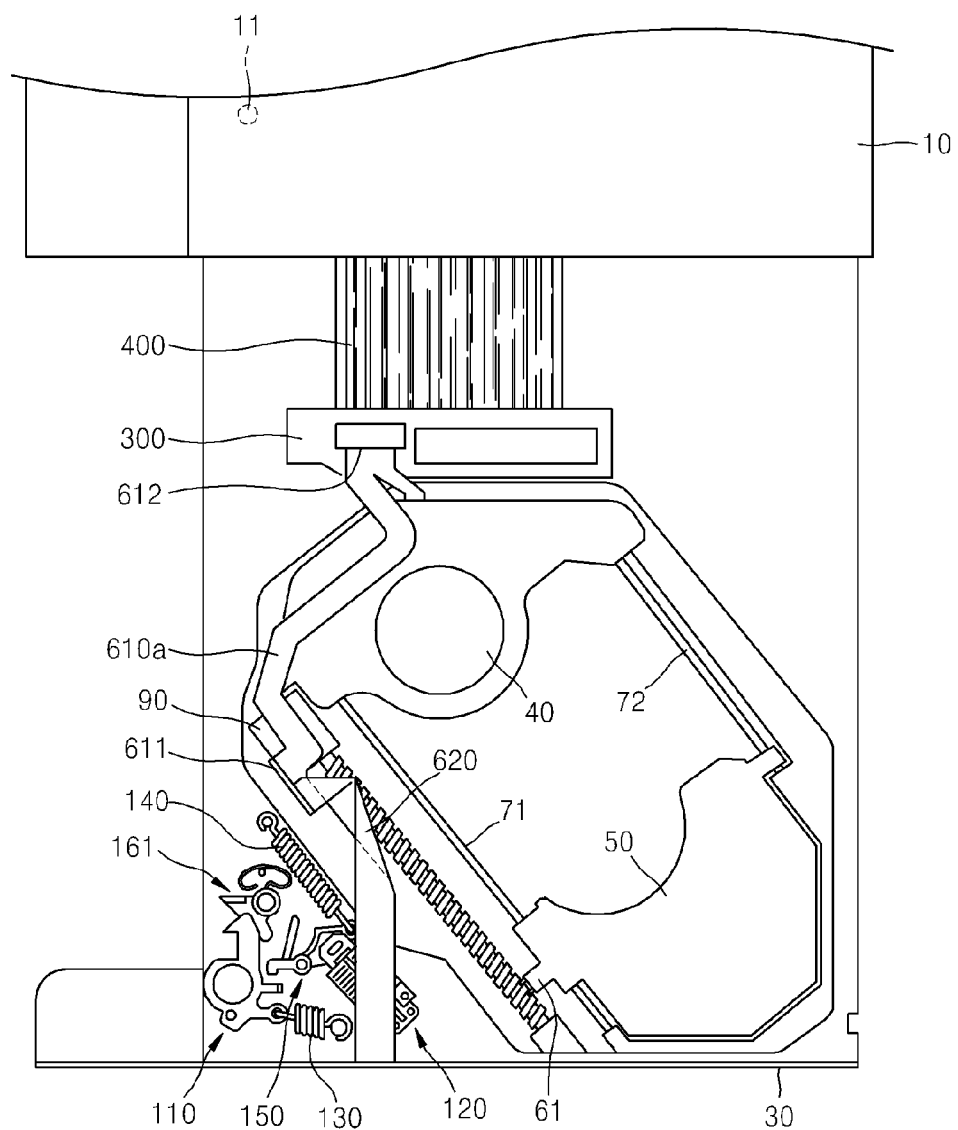
FIG. 14 is a diagram illustrating an example of a rear view of the ODD of FIG. 1 in which the electric devices are connected using the first and second flat cables.

Referring again to the example of FIG. 7, although the spindle motor 40 may be directly connected to the auxiliary circuit board 300, other arrangements may be provided. For example, referring to FIG. 14, the spindle motor 40 may be connected to the first flat cable 610a together with the transfer motor 90. The examples described in FIGS. 8 to 13 may also be applied to the second flat cable 620 shown in FIG. 14.

A number of examples have been described above. Nevertheless, it will be understood that various modifications may be made. For example, suitable results may be achieved if the described techniques are performed in a different order and/or if components in a described system, architecture, device, or circuit are combined in a different manner and/or replaced or supplemented by other components or their equivalents. Accordingly, other implementations are within the scope of the following claims.

What is claimed is:

1. An optical disc drive (ODD) comprising:
   a tray comprising a spindle motor configured to rotate a disc, an optical pickup unit, and a transfer motor configured to slide the optical pickup unit in a radial direction of the disc;
   a first flat cable connected to the transfer motor;
   a circuit board arranged at the front of the tray;
   a main frame in which the tray is slidably installed;
   a locking unit, configured to selectively lock the tray to the main frame, and comprising an electrical actuator; and
   a second flat cable, comprising signal lines covered by an insulator, a first terminal part connected to the first flat cable, a second terminal part connected to the circuit board, and an exposure part formed by removing a portion of the insulator between the first and second terminal parts to expose one of the signal lines therethrough,
   wherein a terminal part of the electrical actuator is connected, through the exposure part, to an actuator signal line among the signal lines.

2. The ODD of claim 1, wherein the first flat cable is a flexible printed circuit (FPC), and the second flat cable is a flexible flat cable (FFC).

3. The ODD of claim 1, wherein the circuit board is arranged at the front of the tray, and a blinker is mounted on the circuit board.

4. The ODD of claim 1, wherein the signal lines comprise first and second actuator signal lines, and the first and second actuator signal lines are arranged at both sides of the second flat cable in a width direction of the second flat cable.

5. The ODD of claim 1, wherein the signal lines comprise first and second actuator signal lines, the exposure part comprises first and second exposure parts configured to expose the first and second actuator signal lines, respectively, and the first and second exposure parts are misaligned with each other in a length direction of the second flat cable.

6. The ODD of claim 1, wherein the circuit board further comprises a switch to activate the actuator.

7. The ODD of claim 1, wherein the first flat cable and the second flat cable are configured to connect to an electric device without additional cables.

8. The ODD of claim 1, further comprising an actuator electrically connected to a main control board through the second flat cable.

9. The ODD of claim 1, further comprising an actuator connected to the circuit board and directly connected to an exposure part of the second flat cable, wherein the exposure part comprises signal lines without insulation and the other regions of the second flat cable comprises signal lines with insulation.

10. The ODD of claim 1, wherein the transfer motor is directly connected to the first flat cable and connected to an auxiliary circuit board disposed opposite of the circuit board.

11. The ODD of claim 1, further comprising a return lever configured to rotatably move an unlocking lever and a locking lever to respective locking positions.

12. An optical disc drive (ODD) comprising:
    a tray comprising a spindle motor configured to rotate a disc, an optical pickup, and a transfer motor configured to slide the optical pickup in a radial direction of the disc;
    a main frame in which the tray is slidably installed;
    a flexible printed circuit (FPC) connected to at least one of the spindle motor and the transfer motor; and
    a flexible flat cable (FFC), comprising signal lines covered by an insulator, a first terminal part connected to the FPC, a second terminal part located on the opposite side of the first terminal part, and one or more exposure parts formed by removing a portion of the insulator between the first and second terminal parts to expose one of the signal lines therethrough.

13. The ODD of claim 12, wherein the one or more exposure parts comprise a plurality of exposure parts arranged separately in a width direction of the FFC.

14. The ODD of claim 12, wherein the one or more exposure parts comprise a plurality of exposure parts, and at least one of the exposure parts is arranged to be misaligned with the other exposure parts in a length direction of the FFC.

15. The ODD of claim 12, further comprising a locking unit, configured to selectively lock the tray to the main frame, and comprising a solenoid,
    wherein a terminal part of the solenoid is connected to the exposed signal line through the one or more exposure parts.

16. The ODD of claim 15, further comprising a circuit board on which a switch to activate the solenoid is provided,
    wherein the second terminal part is connected to the circuit board.

17. An optical disc drive (ODD) comprising:
    a spindle motor configured to rotate a disc;
    an optical pickup;
    a transfer motor configured to slide the optical pickup in a radial direction of the disc;
    a first cable connected to at least one of the spindle motor and the transfer motor;
    a second cable, comprising signal lines covered by an insulator, a first terminal part, a second terminal part located on the opposite side of the first terminal part, and one or more exposure parts formed by removing a portion of the insulator between the first and second terminal parts to expose one of the signal lines therethrough; and
    an electric device connected to the exposed signal line through the one or more exposure parts.

18. The ODD of claim 17, wherein the one or more exposure parts comprise a plurality of exposure parts, and the plurality of exposure parts are arranged separately in a width direction of the second cable.

19. The ODD of claim 17, wherein the one or more exposure parts comprise a plurality of exposure parts, and one of the exposure parts is arranged to be misaligned with the other exposure parts in a length direction of the second cable.

20. The ODD of claim 17, further comprising:
    a tray on which the spindle motor, the optical pickup, and the transfer motor are mounted;
    a main frame in which the tray is slidably installed; and
    a locking unit, configured to selectively lock the tray to the main frame and comprising a solenoid,
    wherein the electric device is the solenoid.

21. The ODD of claim 20, wherein the second terminal part is connected to a circuit board, the circuit board being mounted at the front of the tray and on which a switch configured to activate the solenoid is mounted.

22. The ODD of claim 17, wherein the first terminal part is connected to the first cable.

23. The ODD of claim 17, wherein the first cable is a flexible printed circuit (FPC), and the second cable is a flexible flat cable (FFC).

* * * * *